Sept. 6, 1949.  A. SCHWARZ  2,480,973
SHUTTER AND DIAPHRAGM MECHANISM FOR CAMERAS
Filed April 28, 1945  9 Sheets-Sheet 1

INVENTOR.
Alfred Schwarz
BY Edward H Dumpston
his Attorney

Sept. 6, 1949.  A. SCHWARZ  2,480,973
SHUTTER AND DIAPHRAGM MECHANISM FOR CAMERAS
Filed April 28, 1945  9 Sheets-Sheet 2

INVENTOR.
Alfred Schwarz
BY Edward H. Cumpston
his Attorney

Sept. 6, 1949.　　　　A. SCHWARZ　　　　2,480,973
SHUTTER AND DIAPHRAGM MECHANISM FOR CAMERAS
Filed April 28, 1945　　　　　　　　　　　9 Sheets-Sheet 4

INVENTOR.
Alfred Schwarz
BY Edward H. Cumpston
his Attorney

Sept. 6, 1949.  A. SCHWARZ  2,480,973
SHUTTER AND DIAPHRAGM MECHANISM FOR CAMERAS
Filed April 28, 1945  9 Sheets-Sheet 8

INVENTOR.
Alfred Schwarz
BY Edward H. Cumpston
his Attorney

Sept. 6, 1949.  A. SCHWARZ  2,480,973
SHUTTER AND DIAPHRAGM MECHANISM FOR CAMERAS
Filed April 28, 1945   9 Sheets-Sheet 9

INVENTOR.
Alfred Schwarz
BY Edward H. Rumpston
his Attorney

Patented Sept. 6, 1949

2,480,973

UNITED STATES PATENT OFFICE 2,480,973

SHUTTER AND DIAPHRAGM MECHANISM FOR CAMERAS

Alfred Schwarz, Rochester, N. Y., assignor to Ilex Optical Company, Rochester, N. Y., a corporation of New York Application April 28, 1945, Serial No. 590,770

15 Claims. (Cl. 95—64)

1

This invention relates to shutter and diaphragm mechanisms for cameras of the variety adapted to be adjusted for holding both the shutter and diaphragm open, as desirable, for example, in the focusing of the camera. The ordinary camera may be arranged for focusing by setting the shutter for "time" operation and opening the diaphragm by the means employed for adjusting the aperture, which, however, involves a multiplicity of manipulations and setting and resetting adjustments, some of which are apt to be forgotten with resulting failure in exposure. It has been proposed to partially remedy these difficulties by providing special constructions for holding the shutter blades open, but these constructions have continued to require a number of operations, some of which may be forgotten, and which are difficult to accomplish with the fingers of one hand while steadying the camera with the other. Some of these constructions, furthermore, have involved temporary detachment of normally connected shutter parts which tends to cause derangement and injury of the parts.

One object of the invention, therefore, is to provide an improved mechanism for opening the shutter of a more simple, practical and convenient character, requiring a minimum of manipulations adapted to be readily accomplished by the fingers of one hand, independently of operation of the normal trigger release means and without disturbing the setting of the shutter for a predetermined exposure period.

Another object is to provide an improved shutter mechanism in which, after the setting of the master member, the blades may be opened and closed again by merely moving the master member to set position as in the normal operation of the shutter, so as to require a minimum of manipulation and likelihood of error.

Another object is to provide an improved shutter in which the opening of the blades is accomplished through the use of the normal shutter connections and without requiring their detachment, so as to avoid the likelihood of derangement and injury of the parts.

Another object of the invention is to provide a combined shutter and diaphragm mechanism in an interlocking arrangement and construction adapted to prevent opening of the diaphragm without opening of the shutter and to prevent operation of the shutter without restoring the diaphragm to the desired exposure aperture and also closing the shutter, so as to provide a mechanism which is simple and practically fool-proof in operation.

2

A further object is to provide such a mechanism in which the diaphragm, after being fully opened, may be reset by merely moving the diaphragm operating means to its limit of movement without reference to any indicating scale.

Still a further object is to provide such a mechanism in which the shutter mechanism and any connected synchronizer mechanism is disabled while the diaphragm leaves are open for focusing.

To these and other ends the invention resides in certain improvements and combinations of parts, all as will be hereinafter more fully described, the novel features being pointed out in the claims at the end of the specification.

The invention is embodied in the present instance in association with camera shutter and diaphragm mechanism of the between-the-lens type, the shutter comprising a motor or master member adapted to be set to position to tension spring actuating means for opening and closing the shutter blades on release by a release member or trigger.

Referring more particularly to the drawings, the present embodiment preferably comprises an annular shutter casing having a cylindrical wall 35 (Figs. 1 and 17) and a rear wall 36 with a flange 37 for supporting rear lens means over an exposure opening 38. The front of the casing is closed by cover means (not shown) attached to the front end of the cylindrical wall 35, as well understood in the art. An annular partition or mechanism plate 39 (Fig. 1) is mounted within the cylindrical wall 35, preferably against the inner surface 40 (Fig. 17) of the rear wall 36, the shutter mechanism being mainly mounted on plate 39. Fixed to the rear face of plate 39 is an annular plate 41 from which are struck up forwardly a number of lugs 42. Supported for oscillation on these lugs is a shutter blade ring 43 provided with pins 44 (Fig. 6) rotatably engaged in openings in a plurality of shutter blades 45, respectively, each blade being pivotally connected by a pin and slot as at 46 with the casing, so that oscillation of the blade ring serves to open and close the shutter blades. The blade ring has a lug 47 projecting forwardly through an opening in the plate 39 for actuation of the blade ring by the master member, which will now be described.

The master member is preferably in the form of a lever 48 (Figs. 1 and 2) pivoted at 49 on the plate 39 and having a handle or finger piece 50 projecting through an opening in the casing wall 35. A spring 51 is coiled about this pivot of the lever with one end resting against an inner circular flange 52 of the plate 39 and the other end against a lug 53 on the lever, so as to normally turn the lever in a counter-clockwise direction. The end of the lever adjacent its handle 50 is formed with a circular toothed part or rack 54, meshing with a pinion 55 fixed on a wrist plate 56 rotatably mounted at 57 on the plate 39. Plate 56 is pivotally connected at 58 with one end of a link 59 having a lug 60 against which bears one end of a spring 61 coiled about a post 62 on the plate 39 with its other end bearing against a post 63 on the plate. Link 59 is formed with a rectangular notch 64 for engagement with lug 47 of the blade ring in the position to which the link is moved by the setting of the master member as in Fig. 6. A spring 65 coiled about the post 63 bears at one end against the casing flange 35 and at the other against lug 47 so as to normally rotate the blade ring clockwise to close the blades.

Figures 1, 2, 3, 4, 5:
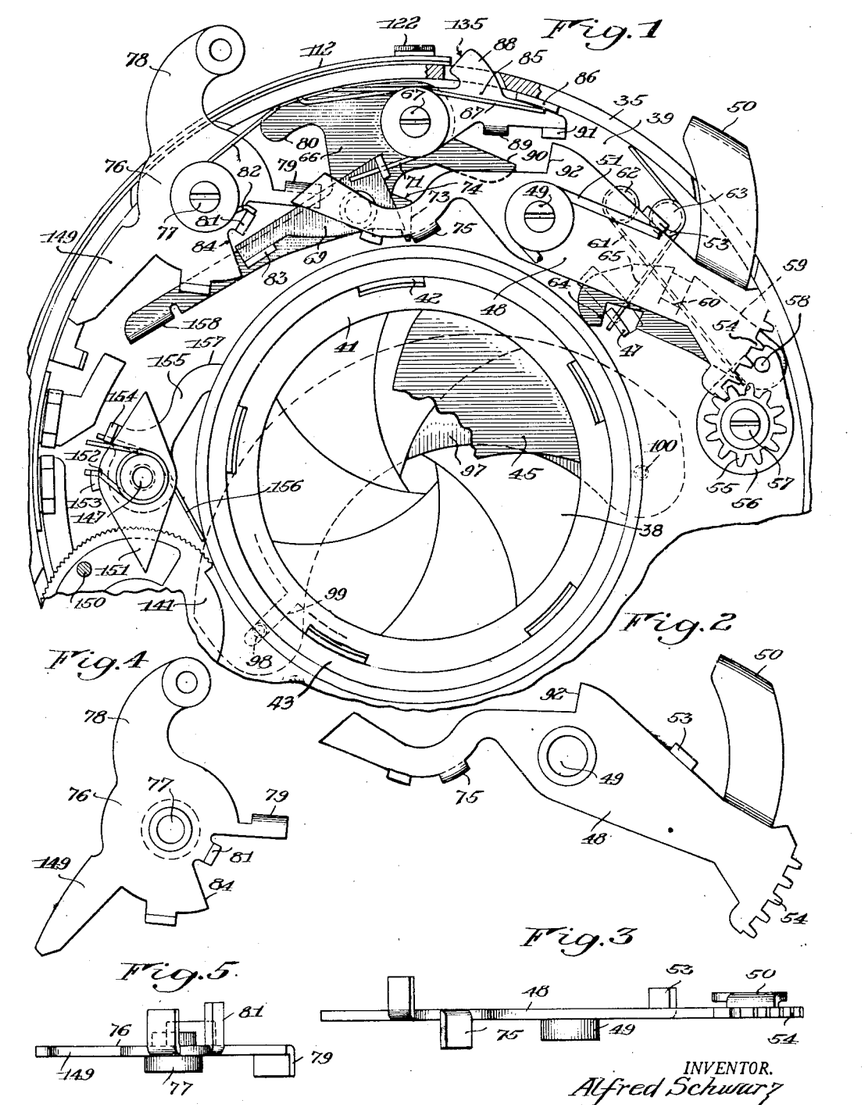
Fig. 1 is a front elevation, partly broken away, of shutter and diaphragm mechanism embodying the present invention and shown with the parts in initial and unset position with the shutter and diaphragm closed.
Fig. 2 is a front elevation of the master member, detached.
Fig. 3 is an edge view of the same.
Fig. 4 is a front elevation of the release member or trigger, detached.
Fig. 5 is a side elevation of the same.

In the initial position of the master lever, as shown in Fig. 1, the free end of link 59 rides on flange 52 of plate 39, the other or pivoted end of the link being in its outward position and tilting the link to cause its recess 64 to pass over lug 47 without engagement during movement of the link toward the left. Setting depression of the master lever handle 50 swings wrist plate 56 to move the link idly toward the left, as its pivot 58 is swung from its outer position shown in Fig. 1 to the inner position shown in Fig. 6. The master lever is releasably locked in this set position by means hereafter described and in this position the blade ring lug 47 is engaged in the notch 64 of the link. On release of the master lever and outward movement of the pivot 58, the link 59 is first moved toward the left to move the blade ring counterclockwise and open the blades and, as the pivot 58 passes dead center, is moved toward the right to move the blade ring clockwise and close the blades, assisted by the blade ring spring 65, thus returning the parts to the position shown in Fig. 1.

The master lever is locked in set position by means of an irregularly shaped locking lever 66 (Figs. 1, 6 and 7) pivoted at 67 on plate 39. Pivoted on the locking lever at 68 is a pawl 69 having a lug 70, and a spring 71, coiled about the pivotal support of the locking lever, bears at one end against the casing and at the other against lug 70 of the pawl so as to turn the pawl clockwise on its pivot against a stop lug 72 on the lever 66, this arrangement serving also to turn the locking lever 66 in a counter-clockwise direction. Lever 66 is formed with a radially extending shoulder 73 and with a shoulder 74 extending transversely thereto, both for cooperation with a rearwardly extending lug 75 on the master lever. As the master lever is set from the position shown in Fig. 1 to that shown in Fig. 6, its lug 75 rides up the shoulder 73 of the locking lever until it reaches shoulder 74 of the lever which is then turned counterclockwise by its spring to engage under and hold the master lever in set position until released by one of the means hereafter described.

The locking lever 66 is normally released by the releasing member or trigger, an irregularly shaped plate or lever 76 pivoted at 77 on plate 39 and having a manually operated handle 78 extending outwardly through an opening in the casing. Release lever 76 has an arm 79 arranged during anti-clockwise rotation to engage the heel 80 of the locking lever to turn it clockwise so as to withdraw shoulder 74 from beneath the lug 75 of the master lever and release the master lever for rotation counter-clockwise by its spring to open and close the shutter blades as described. Trigger 76 has a lug 81 engaged by one end of a spring 82 coiled about the pivot support of the trigger and having its other end bearing against the casing to turn the trigger in a clockwise direction and restore it to initial position.

Means are provided for locking the releasing lever or trigger in its initial or inactive position except when the master lever is moved to set position, for the purpose of preventing operation of the trigger in certain positions of the mechanism. To this end, the pawl 69 on the locking lever has at its free end a lug 83 positioned for engagement, in one position of the locking lever, with a radial shoulder 84 on the releasing lever 76. In the unset position of the master lever shown in Fig. 1, the locking lever is held turned in a clockwise direction by engagement of the lug 75 of the master lever with the radial shoulder 73 of the locking lever and in this position of the locking lever the lug 83 of its pawl 69 is raised into the path of the shoulder 84 of the releasing lever so as to lock it against actuating movement. In the set position of the master lever, however, its lug 75 releases shoulder 73 of the locking lever, permitting the latter to move counter-clockwise so that the lug 83 of its pawl is below the path of movement of shoulder 84 of the trigger, thus releasing the trigger for movement to trip the locking lever 66 and release the master lever for opening and closing the shutter blades.

In the common type of shutter construction, the shutter may be set for "time" operation and the blades opened for focusing and subsequently closed again by actuations of the releasing lever or trigger, but I have found that such focusing opening of the blades may be accomplished in a much more simple, practical and convenient manner and with less likelihood of error. For this purpose, the invention comprises an auxiliary releasing means or latching lever 85 (Figs. 1 and 9), pivoted on the same post support as the locking lever for cooperation with the latter and with the master lever. Latching lever 85 has a lug 86 against which bears one end of a spring 87 coiled about the pivotal support and having its other end bearing against the casing to turn the lever in a counter-clockwise direction and project a lug or finger piece thereof 88 through an opening in the casing. Latch lever 85 has a rearwardly turned lug 89 positioned for engagement with an arm 90 of the locking lever 66 for tripping the locking lever. Projecting forwardly from the latching lever is a lug 91 in position to engage a radial shoulder 92 on the master lever 48 and hold it in partially actuated position after it has moved to open the shutter blades but before completing its movement to close them.

It will be seen from this construction that with the master lever locked in set position by the locking lever 66 (Fig. 6), the arm 90 of the locking lever is raised adjacent lug 89 of the latch lever 85 and lug 91 of the latch lever is spaced from shoulder 92 of the master lever. In such position of the parts, finger piece 88 may be depressed manually, or by means hereafter described, to turn the latch lever clockwise, with the result that it trips the locking lever 66 and shortly thereafter relatches the master lever by interposing its lug 91 in the path of movement of shoulder 92 of the master lever. These parts are so proportioned and arranged that the master lever is relatched on full opening of the blades, so that the blades are held in fully opened position. The engaging faces of the latch lever lug 91 and the master lever shoulder 92 are preferably so inclined or undercut as to releasably hold these parts in latching engagement with each other.

To again restore the blades preparatory to making an exposure, finger piece 50 of the master lever is depressed to reset it and such resetting movement releases the latching lever 85 for return to inactive position and releases the locking lever 66 for actuation by its spring to latch the master lever in set position, with the trigger 78 released ready for operation to make an exposure.

With the master lever in set position, preparatory to making an exposure, such opening of the shutter blades in preparation for focusing may be readily accomplished by the index finger of the right hand by merely depressing the finger piece 88 of the latch lever. After focusing, the blades are closed with the same finger by depressing the finger piece 50 to reset the master lever. The camera may thus be steadied with one hand and prepared for focusing with the other by the two simple steps of first depressing the latch lever 85 and then depressing the master lever handle 50 to reset it, with a minimum of manipulations and leaving the operating hand free without having to manually hold any operating part or lever in position. It will be noted also that this operation is accomplished by a relatively simple mechanism composed of but a few parts of practical construction and that such operation employs the regular connections between the shutter parts in their regular and automatic opening action, without any detachment or disconnection of such parts likely to result in their derangement or injury. After opening the blades and focusing the camera, no special operation is required to close the blades but only the resetting of the master lever in the normal and usual procedure for taking a picture, thus reducing the likelihood of error. Such simplification of the construction and operation is of added importance where the shutter parts are combined with synchronizer mechanism, to avoid the spoiling of exposures and wastage of lamp bulbs, as hereafter referred to.

Figures 13, 14, 15, 16:
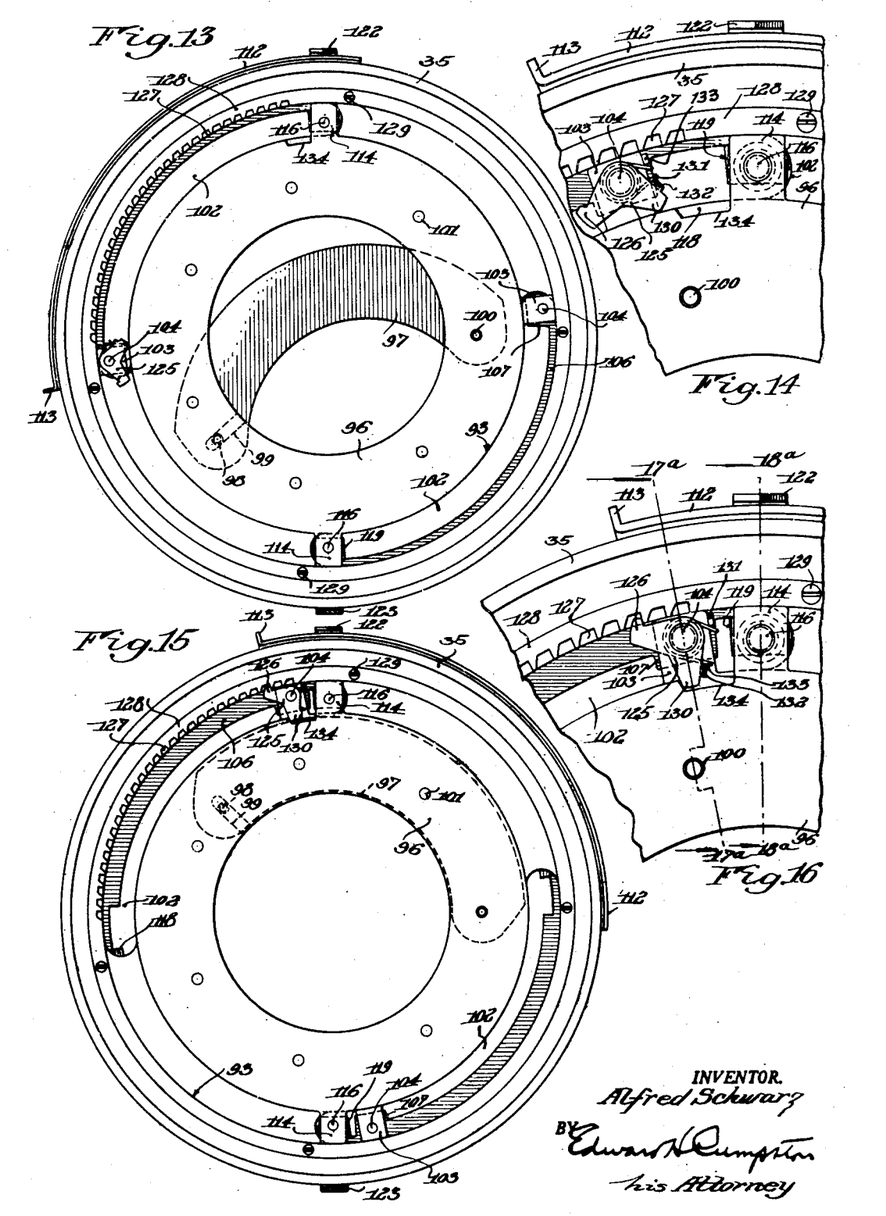
Fig. 13 is a front elevation of the diphragm mechanism in closed position, the shutter mechanism being detached.
Fig. 14 is an enlarged detail of parts shown in Fig. 13, but with the parts in course of movement to open the diaphragm.
Fig. 15 is a view similar to Fig. 13, but showing the diaphragm in open position.
Fig. 16 is an enlargement of parts shown in Fig. 15 and in the same position.
Figures 17, 18, 19, 20, 21, 22:
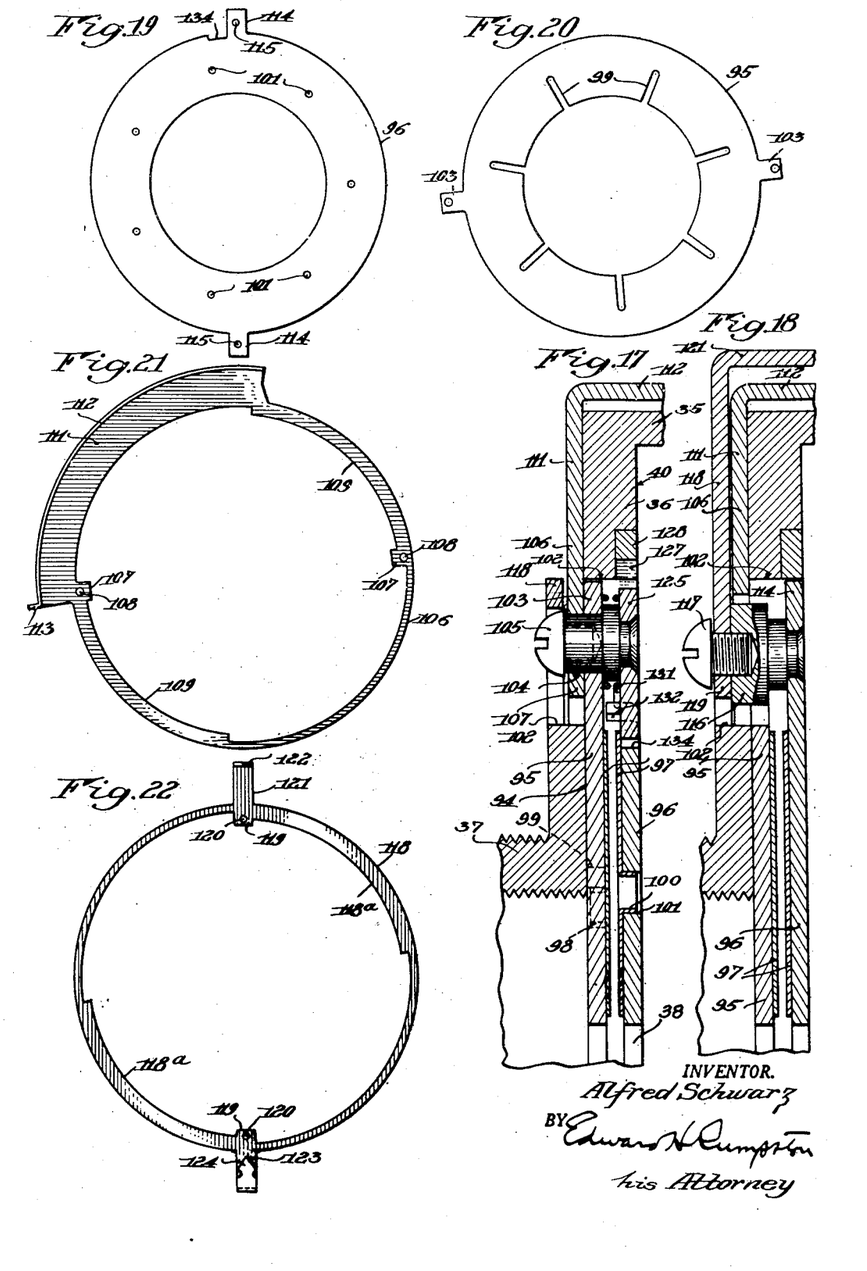
Fig. 17 is an enlarged, sectional elevation on the line 17a—17a in Fig. 16.
Fig. 18 is an enlarged, sectional elevation on the line 18a—18a in Fig. 16.
Fig. 19 is an elevation of plate means for adjusting the diaphragm aperture.
Fig. 20 is an elevation of plate means for opening the diaphragm.
Fig. 21 is an elevation of ring means forming part of the mechanism for opening the diaphragm and shutter.
Fig. 22 is an elevation of ring means forming part of the mechanism for adjusting the diaphragm aperture.
Figure 23:
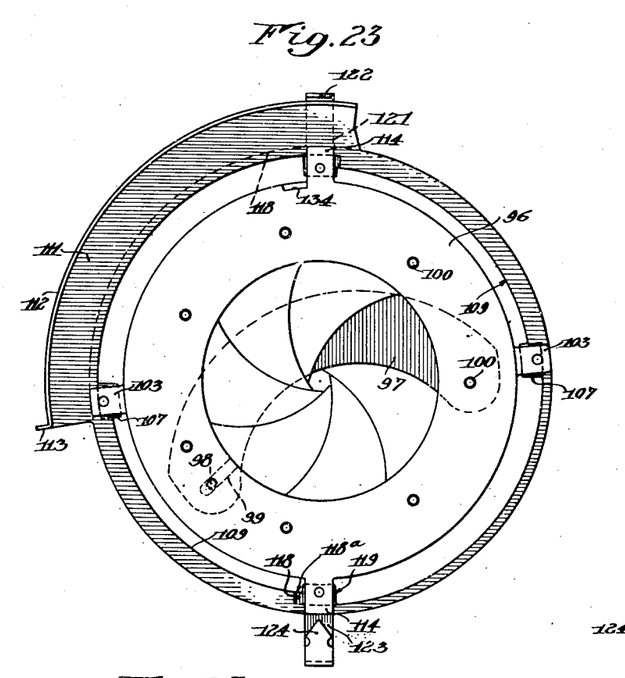
Fig. 23 is a front elevation of some of the diaphragm parts detached from the casing.
Figure 24:
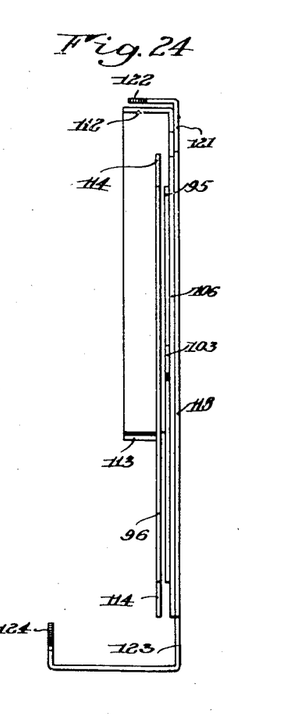
Fig. 24 is an elevation of the parts as seen from the right in Fig. 23.
Figure 25:
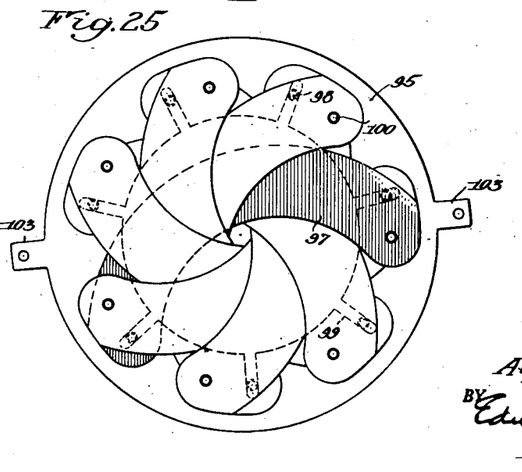
Fig. 25 is a front elevation of the diaphragm leaves associated with the plate shown in Fig. 20.

The invention further comprises the combination with such shutter mechanism of an improved diaphragm mechanism located adjacent the shutter blades on the back wall of the casing. For this purpose the back wall 36 is formed with a circular recess 93 having a rear wall 94 (Figs. 13 and 17). Mounted for oscillation in the recess against its rear wall 94 is an annular plate 95 forming part of the means for opening the diaphragm for focusing and hereafter referred to as an actuating means or plate. Oscillating in recess 93 and spaced in front of actuating plate 95, is an annular plate 96 forming part of the means for adjusting the diaphragm to open position in preparation for focusing and hereafter also referred to as an actuating means or plate. Plates 95 and 96 are retained in position by the cylindrical wall of the recess and each plate is pivotally connected with a plurality of elongated diaphragm leaves 97 located in the space between the plates. Each of the leaves is formed at one end with a flanged trunnion or pivot 98 for pivotal engagement in one of a plurality of radial slots 99 formed in the actuating plate 95. Each of the leaves is provided at its other end with a similar flanged pivot 100 which is pivotally engaged in one of a plurality of openings 101 in actuating plate 96, so that either of the plates 95 or 96 may be oscillated to open or close the diaphragm with the leaves pivoting on the other plate.

Figure 29:
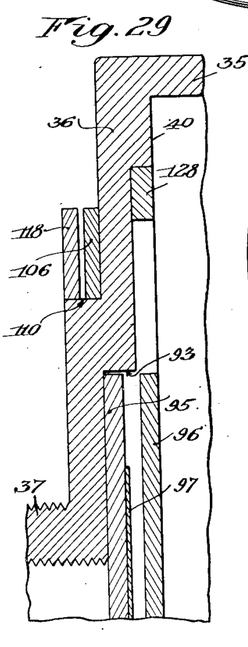
Fig. 29 is an enlarged section on the line 29a—29a in Fig. 28.
Figure 30:
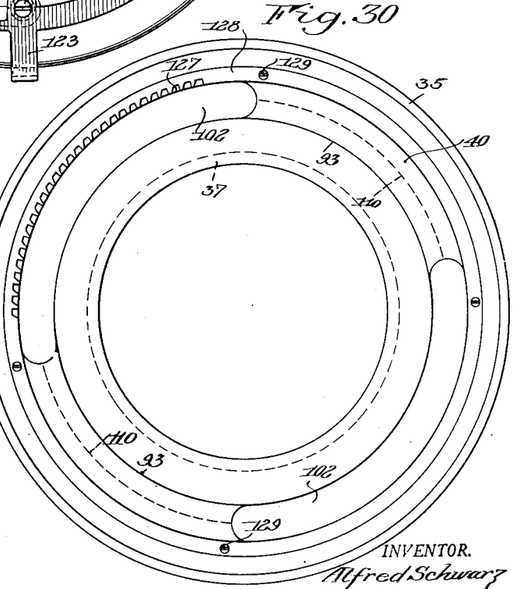
Fig. 30 is a front elevation of the provisions for the diaphragm mechanism on the casing rear wall.

The rear wall 36 of the casing is formed diametrically with arcuate slots 102 (Fig. 30) and actuating plate 95 has peripheral lugs 103 extending radially in the slots 102 (Figs. 13 and 17). Each of these lugs carries a short stud 104 on which is mounted and retained, as by means of a screw 105, a ring 106 hereafter referred to as an actuating member or ring. This ring has inwardly extending lugs 107 formed with openings 108 for attachment to the studs 104 in slots 102, respectively, and diametrically opposite inner peripheral portions 109 of the ring have oscillating bearings on a circular rear shoulder 110 of the casing wall 36 (Fig. 29), for oscillation with the actuating plate 95. Ring 106 has a quadrant extension 111 (Figs. 17 and 21) formed at its periphery with a flange 112 extending forwardly over the cylindrical wall 35 of the casing, for a purpose hereafter described, one end of the flange 112 being turned upwardly as at 113, to serve as a finger piece for oscillating the actuating ring 106 and thereby oscillating the actuating plate 95 for opening and closing the diaphragm blades in connection with a focusing adjustment of the camera.

The actuating plate 96 is similarly formed with peripheral lugs 114 (Fig. 19) extending radially in the slots 102 (Figs. 13 and 18), respectively, each lug being formed with an opening 115 in which is mounted a stud 116 carrying a screw 117. Mounted on screws 117 is a ring 118, hereafter also referred to as an actuating member or ring, which has inwardly extending lugs 119 formed with openings 120 for receiving the screws 117. Ring 118 has opposite, arcuate, inner peripheral portions 118a, which support it for oscillation on the casing shoulder 110, and has a radially projecting arm 121, the outer end of which is turned forwardly over the cylindrical wall 35 of the casing and pointed, as at 122, to serve as an indicator. Ring 118 has also a diametrically opposite arm 123 extended forwardly across the cylindrical wall 35 of the casing with its end turned radially inwardly over the cover plate and pointed, as at 124, to serve as an indicator, the indicating pointers 122 and 124 being adapted for cooperation with indicating scales (not shown) marked on the casing as may be found convenient. The pointer arms 121 and 123 serve as operating means for oscillating ring 118 and its associated plate 96 for opening and closing the diaphragm leaves to obtain a desired exposure aperture.

Figure 26:
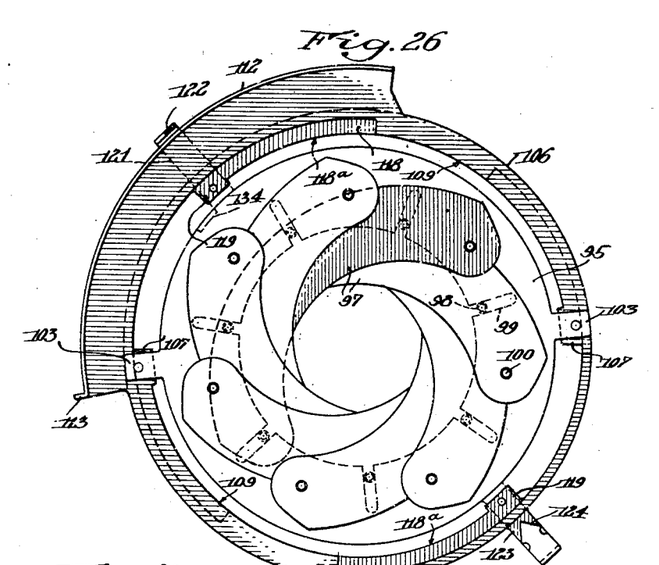
Fig. 26 is a view similar to Fig. 23, but showing the diaphragm leaves adjusted or closed to a desired exposure aperture.
Figure 27:
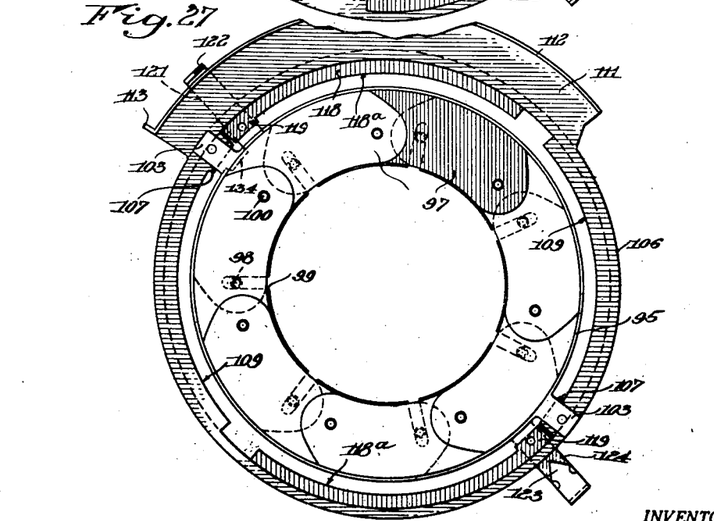
Fig. 27 is a similar view, but showing the diaphragm fully open.
Figure 28:
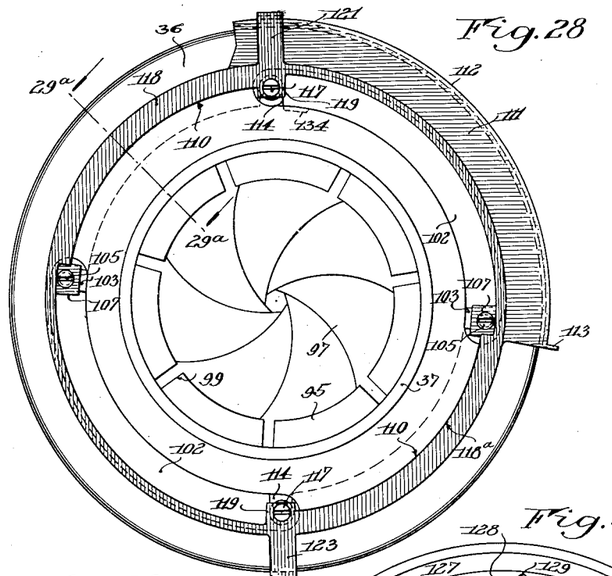
Fig. 28 is a rear elevation of the diaphragm mechanism.

It will be apparent from the above described construction that the actuating ring 118 may be rotated to some such position as shown in Figs. 26 and 27 for adjusting the leaves to a desired aperture, ring 106 being positioned by counterclockwise movement to its normal or inactive position. With the leaves thus adjusted to a desired exposure aperture, ring 106 may be rotated clockwise by means of its finger piece 113 to fully open the leaves, as desirable in focusing a camera, the finger piece 113 being thus moved adjacent the arm 121 of the ring 118, as shown in Fig. 27. After focusing adjustment of the camera to which the diaphragm is applied, finger piece 113 may be moved counter-clockwise from the position shown in Fig. 27 to the position shown in Fig. 26, thereby restoring the diaphragm to the selected aperture previously obtained by adjusting arm 121.

The diaphragm may thus be fully opened as required in focusing a camera, independently of the exposure or aperture setting, but means are preferably provided to limit the opening movement of the ring 106 to prevent it from engaging and moving the ring 118, such means preferably comprising a dog 125 (Figs. 14 and 17) pivotally mounted on the extended forward end of the stud 104 of the plate 95. The dog has a head portion 126 adapted for engagement in one of a series of notches 127 formed on the inner periphery of a ring 128 secured by screws 129 in a recess in the rear wall 36 of the casing about the diaphragm mechanism. The dog 125 has a tail 130 adapted for sliding engagement with the periphery of the plate 96. A spring 131 coiled about the pivot of the dog bears at one end against a lug 132 on the tail of the dog and at the other end against an ear 133 on the adjacent lug 103 of the plate 95. The periphery of the plate 96 is formed adjacent its stud 116 with a notch 134 into which the tail of the dog is adapted to drop under actuation by its spring, thereby raising the head portion 126 of the dog into dogging engagement with one of the notches 127 of rack 128 and stopping and locking plate 95 before contact of its lug 103 with the stud 116 of the plate 96. Such means thus prevents excessive movement of the plate 95 far enough to engage and disturb the setting of the plate 96 to whatever position it may have been adjusted.

The quadrant flange 112 of ring 106 is provided for automatic coaction with the above described shutter mechanism. In the preferred embodiment, the finger piece 88 of the latch lever 85 is formed with an inclined or cam face 135 (Fig. 1), normally lying in the path of movement of the leading edge of the quadrant flange. With the master lever in set position, the clockwise movement of the flange 112, to open the diaphragm, brings its leading edge into engagement with the cam face 135 of the latching lever, thereby depressing the lever to partially trip the master lever as described and open the shutter blades. If the finger piece 88 of the latch lever is manually depressed to open the shutter, then flange 112 moves over it to open the diaphragm also, and the construction thus permits of independent opening of the shutter, if so desired. In either case, the diaphragm cannot be opened by finger piece 113 of flange 112 unless the shutter is also latched opened. On opening the diaphragm, its flange 112 holds the finger piece 88 of the latch lever depressed as long as the diaphragm is open, so that the master lever cannot be latched in set position, and the user of the camera is thus warned after a focusing adjustment, that the diaphragm must be closed before proceeding to make an exposure. On return of the flange 112, and its finger piece 113, counter-clockwise to initial position, the diaphragm is restored to any pre-adjusted aperture. The trigger remains locked against operation, however, as an indication that the master lever must be reset. The photographer is thus forced to set the master lever, thereby releasing the latching lever 85, closing the shutter blades also and releasing the trigger for operation in accordance with the usual procedure for making an exposure.

Figures 11, 12:
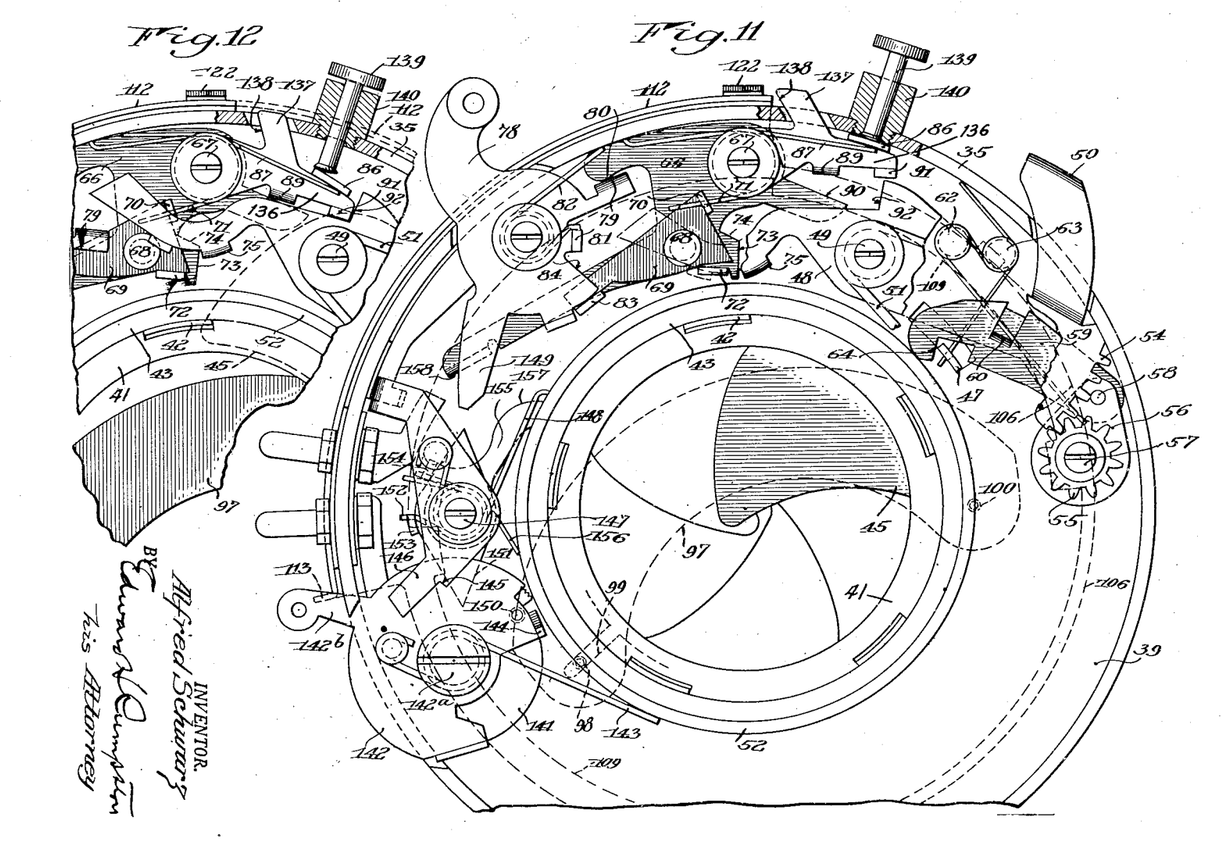
Fig. 11 is a view similar to Fig. 1, but showing a modified construction with the parts in initial and unset position.
Fig. 12 is a detail of parts shown in Fig. 11, but with the shutter open.

In the modified embodiment shown in Fig. 11, the latching lever 136 has a finger piece 137 which, instead of being cam-shaped for actuation by the diaphragm operating flange 112, has a rearwardly inclined or hook-shaped edge 138 adapted to block the movement of the flange 112 and thus prevent full opening of the diaphragm to allow focusing adjustment of the camera until after the opening of the shutter for the same purpose. The shutter may be opened by either depressing the finger piece 137 of the latch lever, or the latter may be provided with a plunger 139 sliding in a bearing 140 in the casing for engagement at its inner end with the latch lever to depress it and open the shutter blades. The diaphragm flange 112 may then be moved to fully open the diaphragm and serves as before to prevent operation of the master lever or the trigger until the diaphragm has been closed to its desired aperture setting. In both of the above modifications, therefore, it is necessary, after focusing adjustment of the camera to restore the diaphragm to its closed position or to its predetermined aperture setting and to reset the master lever, thus closing the shutter blades before the trigger can be released for operation, so that the mechanism is rendered substantially fool-proof in operation.

Figures 6, 7, 8, 9:
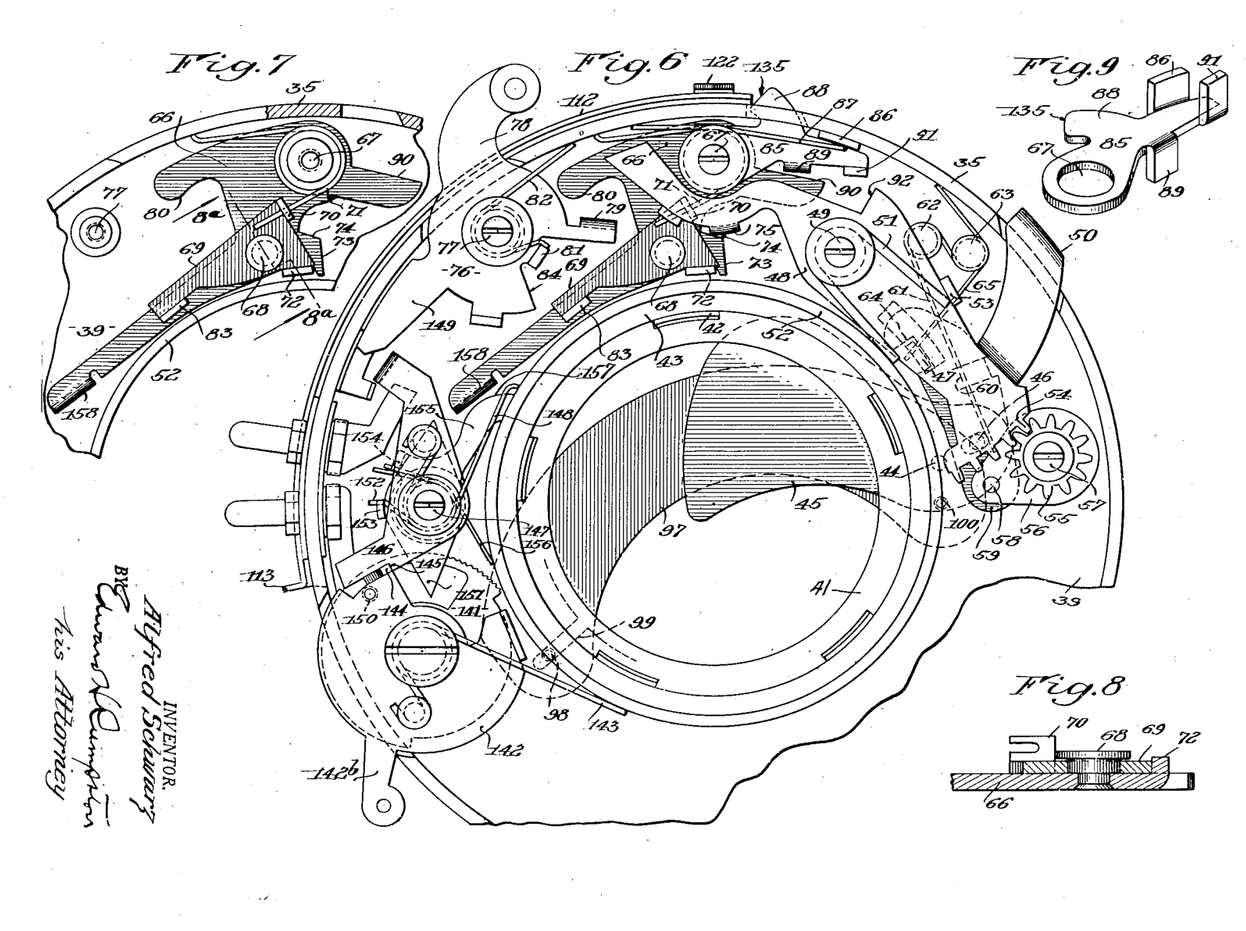
Fig. 6 is a view similar to Fig. 1, but showing the master member moved to set position.
Fig. 7 is a detail view of locking member parts shown in Fig. 6.
Fig. 8 is a sectional view on the line 8a—8a in Fig. 7.
Fig. 9 is a perspective view of a latch member shown in Fig. 6.
Figure 10:
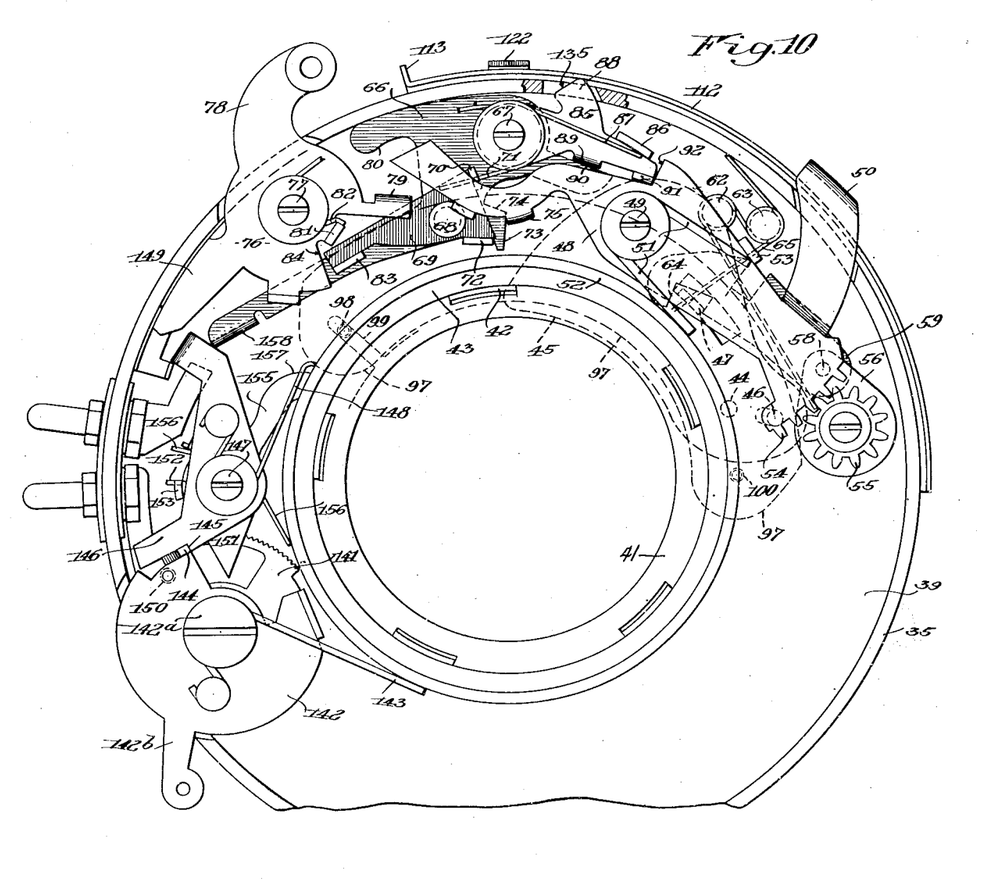
Fig. 10 is a view similar to Fig. 6, but showing the shutter and diaphragm fully open as desired in focusing the camera.

The above features are particularly advantageous in a construction comprising a built-in synchronizer mechanism, actuated by the usual shutter release member or trigger, such as disclosed in my Letters Patent Nos. 2,355,825, dated Aug. 15, 1944, and 2,358,941, dated September 26, 1944. As fully disclosed in said patents, such a synchronizer mechanism comprises a pair of disks 141 and 142, rotated about a pivot 142a on the casing and provided with coacting electrical contacts (not shown). Disk 141 is manually adjusted to position, relative to disk 142, to determine the time of engagement of their respective contacts for closing the synchronizer circuit. Disk 142, by means of its handle 142b, is moved from the initial position shown in Fig. 11 to position to tension an actuating spring 143, as shown in Figs. 6 and 10, in which position the disk is latched by the engagement of a lug 144 thereon with a shoulder 145 on a latching lever 146 pivoted at 147 on the casing and actuated by a spring 148. The other end of lever 146 lies in the path of a tail 149 on trigger 78, so that actuation of the trigger moves latching lever 146 clockwise to release disk 142 for rotation back to initial position. During such return of the disk 142, a pin 150 therein strikes a diamond-shaped lever 151 pivoted on the support 147, as best shown in Fig. 1. Lever 151 is moved counter-clockwise by a spring 152 bearing against a lug 153 on the lever. The other end of the spring bears against a lug 154 on a lever 155 pivoted about the support 147. A second spring 156 is wound about the support 147 and bears against the lug 154 to also serve in turning lever 155 in a clockwise dirction so that its free end 157 normally rests on the inner flange 52 of the casing. Locking lever 66 has an elongated tail portion 158 lying in the path of movement of the end 157 of lever 155 when the locking lever 66 is moved to locking position by the setting of the master lever.

With the master lever in set position so as to unlock the trigger and with the synchronizer lever moved to set position, actuation of the trigger causes its tail 149 to trip latch lever 146, releasing the synchronizer disk 142 which, by its pin 150, swings lever 151 counter-clockwise. Lever 151, striking lug 154, swings lever 155 counter-clockwise so that its end 157 strikes tail 158 and trips the locking lever to open and close the shutter.

It will be evident from this construction that in focusing the camera, it is necessary to first set the master lever and open the shutter blades manually or by the opening of the diaphragm, thereby in either case locking the trigger against actuation and preventing inadvertent operation of the synchronizer until after the diaphragm has been closed to its preselected aperture, the shutter blades closed and the master lever reset ready for an exposure. The construction and operation of the parts are thus so coordinated as to reduce to a minimum the likelihood of error in the order of operation of the parts in focusing and thereby prevent in effective exposures or operations of the synchronizer, and avoid wastage of film and synchronizer bulbs.

The operation of the mechanism has been described in connection with its construction and it will be seen that the invention accomplishes its objects. While it has been herein disclosed by reference to details of a preferred embodiment, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. A camera shutter comprising a plurality of shutter blades, a plurality of diaphragm leaves, operating means for opening and closing said blades for effecting a camera exposure independently of movement of said leaves, auxiliary means for opening said blades during focusing adjustment of the camera, actuating means separate from said operating means for opening and closing said leaves, and retaining means connected with said actuating means and movable thereby to position for engaging and retaining said auxiliary means in position for opening said shutter blades while said actuating means is in position for opening said diaphragm leaves.

2. The combination with a camera shutter mechanism comprising a plurality of shutter blades, operating means for opening and closing said blades to effect a camera exposure and auxiliary means for opening and closing said blades to permit focusing adjustment of said camera, of a diaphragm mechanism comprising a plurality of diaphragm leaves, actuating means separate from said operating means for manually opening and closing said leaves independently of movement of said blades, and retaining means connected with said actuating means for movement thereby to position for engaging and retaining said auxiliary shutter means in position for opening said shutter blades while said actuating means is in position for opening said diaphragm leaves.

3. The combination with a camera shutter mechanism comprising a plurality of shutter blades, a spring actuated master member adapted to be set to position for opening and closing said blades under actuation by said spring, a locking member for locking said master member in set position and latch means for tripping said locking member and latching said master member in partially actuated position with said shutter blades open, of a diaphragm mechanism comprising a plurality of diaphragm leaves, actuating means for opening and closing said leaves to permit focusing adjustment of said camera, and retaining means connected with said actuating means for movement thereby to position for engaging and retaining said latch means in position to latch said master member and retain said shutter blades in open position while said actuating means is in position for opening said diaphragm leaves.

4. The combination with a camera shutter mechanism comprising a plurality of shutter blades, a spring actuated master member adapted to be set to position for opening and closing said blades under actuation by said spring, a locking member for locking said master member in set position, a release member for tripping said locking member for opening and closing said blades to effect a camera exposure, and auxiliary latch means for tripping said locking member and latching said master member in partially actuated position with said blades open, of diaphragm mechanism comprising a plurality of diaphragm leaves, actuating means for opening and closing said leaves to permit focusing adjustment of said camera, and retaining means connected with said actuating means and movable thereby to position for engaging and retaining said latch means in position for opening said shutter blades while said actuating means is in position for opening said diaphragm leaves.

5. The combination with a camera shutter mechanism comprising a plurality of blades, a spring actuated master member adapted to be set to position for opening and closing said blades under actuation by said spring, a locking member for locking said master member in set position, actuating means connecting said master member and blades for opening and closing said blades on release of said master member by said locking member, a trigger for tripping said locking member to release said master member, a spring actuated latch member provided with means for tripping said locking member and latching said master member in partially actuated position with said blades open to permit focusing adjustment of said camera, said master member being manually movable from said partially actuated position to reset the same and release said latching member and said actuating means being operable to close said blades during said resetting of said master member, of diaphragm mechanism comprising a plurality of diaphragm leaves, operating means for opening and closing said leaves to permit focusing adjustment of said camera, and retaining means connected with said operating means for movement thereby to position for engaging and retaining said latch member in position to hold said shutter blades open while said operating means is in position for opening said diaphragm leaves.

6. The combination with a camera shutter mechanism comprising a plurality of shutter blades, operating means provided with a release member for opening and closing said blades to effect a camera exposure, and auxiliary means for opening said blades independently of operation of said release member, of a diaphragm mechanism comprising a plurality of diaphragm leaves, and actuating means for opening and closing said leaves to permit focusing adjustment of said camera, said auxiliary means and actuating means having parts each lying in the path of movement of the other for obstructing the movement of said actuating means while said auxiliary means is in inactive position and for obstructing the movement of said auxiliary means while said actuating means is in active position with said leaves open.

7. The combination with a camera shutter mechanism comprising a plurality of shutter blades, operating means provided with a release member for opening and closing said blades to effect a camera exposure and auxiliary means for opening said blades independently of operation of said release member to permit focusing adjustment of said camera, of diaphragm mechanism comprising a plurality of diaphragm leaves, an actuating means movably connected with each of said leaves adjacent one end thereof, a second actuating means movably connected with each of said leaves adjacent the other end thereof, each of said actuating means being movable to open and close said leaves, and retaining means connected with one of said actuating means for engaging and retaining said auxiliary means in position for opening said shutter blades while said connected actuating means is in position for opening said diaphragm leaves.

8. The combination with a camera shutter mechanism comprising a plurality of shutter blades, operating means provided with a release member for opening and closing said blades to effect a camera exposure and auxiliary means for opening said blades independently of operation of said release member, of diaphragm mechanism comprising a plurality of diaphragm leaves, an actuating means movably connected with each of said leaves adjacent one end thereof and movable to adjust said leaves to a desired exposure aperture, a second actuating means movably connected with each of said leaves adjacent the other end thereof and movable to open and close said leaves to permit focusing adjustment of said camera, and retaining means connected with said second actuating means for engaging and retaining said auxiliary means in position for opening said shutter blades while said second actuating means is in position for opening said diaphragm leaves.

9. The combination with a camera shutter mechanism comprising a plurality of shutter blades, operating means provided with a release member for opening and closing said blades to effect a camera exposure and auxiliary means for opening said blades independently of operation of said release member, of diaphragm mechanism comprising a plurality of diaphragm leaves, an actuating means movably connected to each of said leaves adjacent one end thereof and movable to adjust said leaves to a desired exposure aperture, a second actuating means movably connected with each of said leaves adjacent the other end thereof and movable manually to open and close said leaves to permit focusing adjustment of said camera, said second actuating means being provided with retaining means for for engaging and retaining said auxiliary means in position for opening said shutter blades while said second actuating means is in position for opening said diaphragm leaves.

10. The combination with a camera shutter mechanism comprising a plurality of shutter blades, operating means provided with a release member for opening and closing said blades to effect a camera exposure and auxiliary means for locking said release member against movement and for opening said blades and retaining them in open position during focusing adjustment of said camera, of diaphragm mechanism comprising a plurality of diaphragm leaves, actuating means movably connected with each of said leaves adjacent one end thereof and movable to adjust said leaves to a desired exposure aperture, a second actuating means movably connected with each of said leaves adjacent the other end thereof and movable manually in opposite directions for opening and closing said leaves to permit focusing adjustment of said camera, and retaining means connected with said second actuating means for engaging and retaining said auxiliary means in position for locking said release member and opening said shutter blades while said second actuating means is in position for opening said diaphragm leaves.

11. The combination with a camera shutter mechanism comprising a plurality of shutter blades, a spring actuated master member movable to set position for actuation by said spring for opening and closing said blades to effect a camera exposure, a locking member for releasably locking said master member in set position, a release member for tripping said locking member, and auxiliary means for tripping said locking member and releasing said master member for opening said blades and retaining them in open position during focusing adjustment of said camera, of diaphragm mechanism comprising a plurality of diaphragm leaves, an actuating means movably connected with each of said leaves adjacent one end thereof and movable to adjust said leaves to a desired exposure aperture, a second actuating means movably connected with each of said leaves adjacent the other end thereof and movable to open and close said leaves to permit focusing adjustment of said camera, stop means comprising a part movable with one of said actuating means for stopping the movement of the other thereof to prevent interference therebetween, and retaining means connected with said second actuating means for engaging and retaining said auxiliary means in position for releasing said master member and opening said shutter blades while said second actuating means is in position for opening said diaphragm leaves.

12. A camera shutter comprising a plurality of shutter blades, a plurality of diaphragm leaves, operating means for opening and closing said blades for effecting a camera exposure independently of movement of said leaves, auxiliary means for opening said blades during focusing adjustment of the camera independently of movement of said leaves, actuating means separate from said operating means for opening and closing said leaves, and retaining means connected with said actuating means and movable thereby to position for engaging and retaining said auxiliary means in position for opening said shutter blades while said actuating means is in position for opening said diaphragm leaves.

13. A camera shutter comprising a plurality of shutter blades, a plurality of diaphragm leaves, operating means for opening and closing said blades to effect a camera exposure independently of movement of said leaves, auxiliary means for opening said blades and retaining them in open position during focusing adjustment of the camera independently of movement of said leaves, adjustable means for adjusting said leaves to obtain a desired exposure aperture, actuating means separate from said operating means for opening and closing said leaves and retaining them in open position during focusing of the camera independently of said adjustable means, and retaining means connected with said actuating means and movable thereby for engaging and retaining said auxiliary means in position for opening said shutter blades while said actuating means is in position for opening said diaphragm leaves.

14. A camera shutter comprising a plurality of shutter blades, a plurality of diaphragm leaves, operating means for opening and closing said blades to effect a camera exposure independently of movement of said leaves, auxiliary means provided with a cam surface for opening said blades during focusing adjustment of the camera, and actuating means for opening and closing said leaves provided with a part cooperating with said cam surface to open said shutter blades when said actuating means is moved to open said diaphragm leaves.

15. A camera shutter comprising a plurality of shutter blades, a plurality of diaphragm leaves, operating means for opening and closing said blades to effect a camera exposure independently of movement of said leaves, auxiliary means for opening said blades during focusing adjustment of the camera independently of movement of said leaves, and actuating means for opening and closing said leaves, said auxiliary means having a part arranged to engage and hold said actuating means in the inactive position thereof.

ALFRED SCHWARZ.

REFERENCES CITED

The following references are of record in the file of this patent:

UNITED STATES PATENTS

| Number | Name | Date |
| --- | --- | --- |
| 2,168,893 | Aiken | Aug. 8, 1939 |
| 2,206,132 | Stewart | July 2, 1940 |
| 2,222,298 | Nerwin | Nov. 19, 1940 |
| 2,249,540 | Riddell | July 15, 1041 |
| 2,269,401 | Steiner | Jan. 6, 1942 |
| 2,327,591 | Brueck | Aug. 24, 1943 |
| 2,333,820 | Riddell | Nov. 9, 1943 |
| 2,344,382 | Aiken | Mar. 14, 1944 |
| 2,354,168 | Aiken | July 18, 1944 |
| 2,356,880 | Pignone | Aug. 29, 1944 |
| 2,362,547 | Fuerst | Nov. 14, 1944 |
| 2,380,610 | Pignone | July 31, 1945 |